United States Patent
Kokare et al.

(10) Patent No.: US 10,334,222 B2
(45) Date of Patent: Jun. 25, 2019

(54) FOCUS-BASED VIDEO LOOP SWITCHING

(71) Applicant: Adobe Systems Incorporated, San Jose, CA (US)

(72) Inventors: Pranjali Kokare, Nanded (IN); Geoffrey Oxholm, San Francisco, CA (US); Zhili Chen, San Jose, CA (US); Duygu Ceylan Aksit, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/817,918

(22) Filed: Nov. 20, 2017

(65) Prior Publication Data
US 2019/0158800 A1 May 23, 2019

(51) Int. Cl.
| | |
|---|---|
| *H04N 13/189* | (2018.01) |
| *G06K 9/62* | (2006.01) |
| *G06K 9/00* | (2006.01) |
| *H04N 13/167* | (2018.01) |
| *H04N 13/332* | (2018.01) |
| *H04N 13/366* | (2018.01) |

(52) U.S. Cl.
CPC ....... *H04N 13/189* (2018.05); *G06K 9/00758* (2013.01); *G06K 9/623* (2013.01); *G06K 9/6215* (2013.01); *H04N 13/167* (2018.05); *H04N 13/332* (2018.05); *H04N 13/366* (2018.05)

(58) Field of Classification Search
CPC .. H04N 13/189; H04N 13/167; H04N 13/332; H04N 13/366
See application file for complete search history.

(56) References Cited

U.S. PATENT DOCUMENTS

| | | | | |
|---|---|---|---|---|
| 9,618,748 | B2 * | 4/2017 | Munger | G02B 27/017 |
| 9,754,626 | B1 * | 9/2017 | Garrett | G11B 27/036 |
| 10,062,410 | B2 * | 8/2018 | Bradley | G11B 27/007 |
| 2010/0040349 | A1 * | 2/2010 | Landy | G11B 27/005 |
| | | | | 386/353 |

(Continued)

OTHER PUBLICATIONS

Adobe Conversions Team, "Let's Get Experimental: Behind the Adobe Max Sneaks", https://blogs.adobe.com/conversations/2016/11/lets-get-experimental-behind-the-adobe-max-sneaks.html, Nov. 4, 2016, 9 pages.

(Continued)

*Primary Examiner* — Mishawn N Hunter
(74) *Attorney, Agent, or Firm* — Kilpatrick Townsend & Stockton LLP

(57) ABSTRACT

Certain embodiments involve switching to a particular video loop based on a user's focus while displaying video content to a user. For example, a video playback system identifies a current frame of the video content in a current region of interest being presented to a user on a presentation device. The video playback system also identifies an updated region of interest in the video content. The video playback system determines that a start frame and an end frame of a video portion within the region of interest have a threshold similarity. The video playback system selects, based on the threshold similarity, the video portion as a loop to be displayed to the user in the updated region of interest. The video playback system causes the presentation device to display the video portion as the loop.

18 Claims, 5 Drawing Sheets

(56) References Cited

U.S. PATENT DOCUMENTS

| | | | | |
|---|---|---|---|---|
| 2014/0327680 | A1* | 11/2014 | Hoppe | G06F 3/048 |
| | | | | 345/473 |
| 2015/0254281 | A1* | 9/2015 | Sauve | G06F 17/30268 |
| | | | | 348/239 |
| 2017/0032819 | A1* | 2/2017 | Sevilla-Lara | G11B 27/007 |
| 2017/0062006 | A1* | 3/2017 | Plom | G11B 27/007 |
| 2017/0117016 | A1* | 4/2017 | Hoppe | G11B 27/007 |
| 2018/0091743 | A1* | 3/2018 | Bradley | H04N 5/2621 |
| 2018/0205999 | A1* | 7/2018 | Garrett | H04N 21/47205 |

OTHER PUBLICATIONS

Green Buzz, "VR Vs 360-Degree Video", http://greenbuzzagency.com/vr-vs-360-degree-video/, Dec. 1, 2016, 7 pages.
Oculus VR, LLC, "Oculus Rift", https://www.oculus.com/rift/, Oct. 2017, 15 pages.
Drudger, "Wallpaper by Drudger on Deviant Art", https://drudger.deviantart.com/gallery/5276323/Wallpaper, 2017, 6 pages.
Liao Zicheng, "Automated Video Looping With Progressive Dynamism", ACM Trans Graphics (SIGGRAPH), vol. 32, Issue 4, Jul. 2013, 10 pages.

* cited by examiner

FOCUS-BASED VIDEO LOOP SWITCHING

TECHNICAL FIELD

This disclosure relates generally to automated analysis and processing of video content for video playback systems. More specifically, but not by way of limitation, this disclosure relates to switching to a particular video loop based on a user's focus while displaying video content to a user.

BACKGROUND

In video processing and use, it is often desirable to create a loop that, when played, appears to have an infinite duration. A loop is a repeated series of images that plays multiple times such that after the series of images is played at one iteration, the next iteration immediately begins. For example, a loop may be a one minute video clip of a fire that is repeatedly played on a screen in a hotel lobby to provide the appearance of a fire. Loop has many applications, such as providing ambiance in public or private locations (e.g., restaurants, homes, etc.).

Loop-extraction software is used to select loops in a given video and cause the selected loops to be displayed to a user. Extracting a loop allows playback software to return to an earlier point in time of a video and extend the video for a subsequent period (i.e., by replaying the loop one or more times from the earlier point in time).

Existing loop-extraction solutions present certain limitations. For example, virtual reality environments present 360-degree videos to users. A 360-degree video provides flexibility to view video content in multiple directions, thereby creating a more immersive experience. But existing loop-extraction solutions, which are designed for standard videos rather than 360-degree videos, do not account for the user's viewing direction or other indicators of a user's focus when selecting one or more loops to be played.

SUMMARY

Certain embodiments involve switching to a particular video loop based on a user's focus while displaying video content to a user. For example, a video playback system identifies a current frame of the video content in a current region of interest being presented to a user on a presentation device. The video playback system also identifies an updated region of interest in the video content. The video playback system determines that a start frame and an end frame of a video portion within the region of interest have a threshold similarity. The video playback system selects, based on the threshold similarity, the video portion as a loop to be displayed to the user in the updated region of interest. The video playback system causes the presentation device to display the video portion as the loop.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
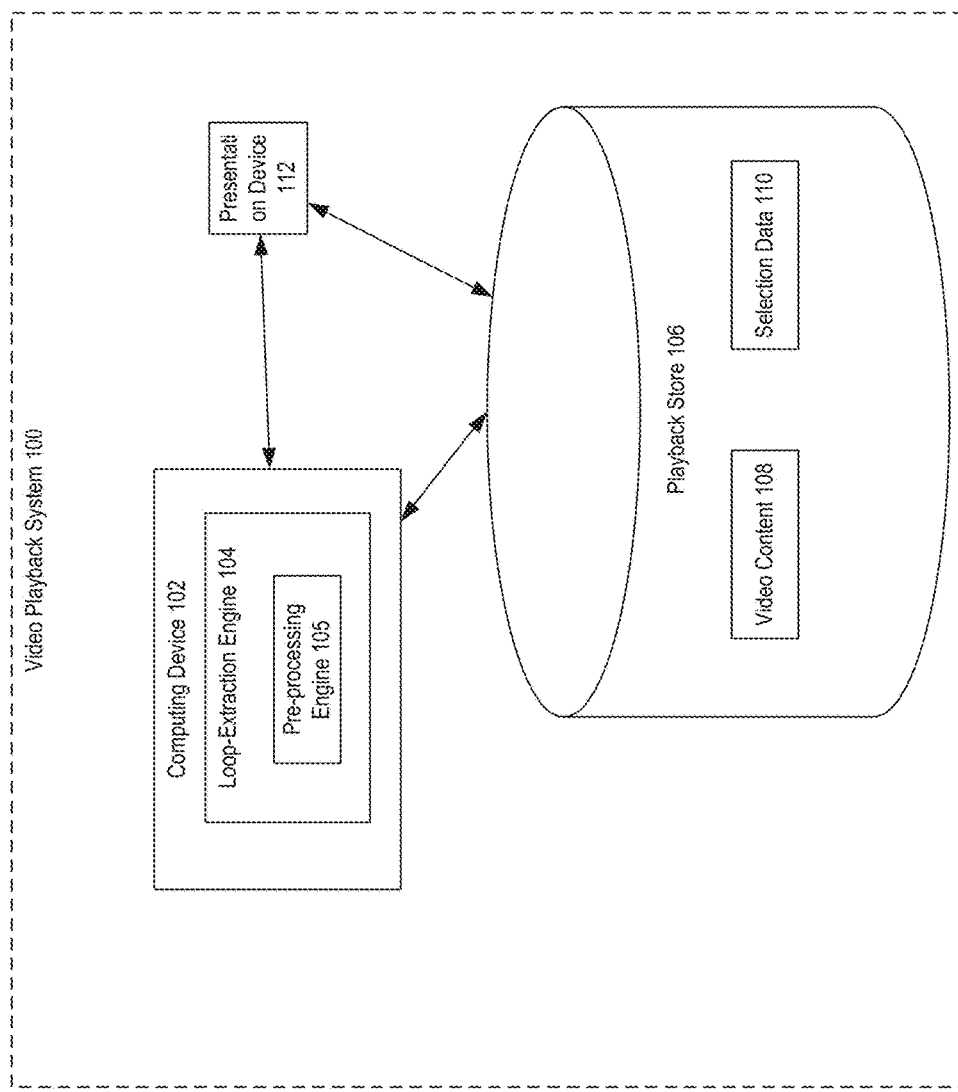
FIG. 1 depicts an example of a playback system for switching to a particular video loop based on a user's focus while displaying video content to a user, according to certain embodiments of the present disclosure.

Certain embodiments involve a focus-based video loop switching. For instance, a loop-extraction engine selects and prioritizes loops in video content, such as (but not limited to) 360-degree videos, based on a region of interest. The region of interest is a portion of the displayed video content on which a user is currently focused or is likely to be focused. For a 360-video, the loop-extraction engine can detect the region of interest based on, for example, a user's orientation as determined from the other equipment used to view the 360-degree video (e.g., a virtual reality headset). These embodiments allow the loop-extraction engine to identify suitable loops in the direction in which the user is looking (or some other region of interest) and rank these loops accordingly.

The following non-limiting example is provided to introduce certain embodiments. In this example, a loop-extraction engine of a video playback application identifies a current frame of video content in a region of interest being currently presented to a user. The region of interest is a portion of the current frame at which the user is looking or is likely looking. A loop extraction engine identifies a region of interest based on one or more focus indicators, such as an orientation of a virtual reality ("VR") equipment with respect to 360-degree video content played by the VR equipment. The loop-extraction engine subsequently identifies an updated region of interest in the presented video content. For instance, if the video content is 360-degree video, the loop-extraction engine determines that the orientation of the VR equipment has changed to a new direction.

Continuing with this example, the loop-extraction engine determines which video portions have sufficiently similar start and end frames for the updated region of interest having the user's focus (or likely focus). Sufficient similarity in the start and ends frames allows the loop to be repeatedly played back to the user with few visual indicators (or no visual indicators) of the loop restarting. For instance, a video portion could depict an object in motion. If the start and end frames depict the object in the same position, the playback will lack a sudden change in the object's position if the video portion restarts (i.e., moves from the end frame to the start frame), thereby reducing the likelihood that the user will perceive the restarted loop. The loop-extraction engine selects this video portion as a loop to be presented to the user in the updated region of interest.

As used herein, the term "video content" refers to a series of images having data representing an appearance of movement. Images can represent solid colors, patterns, real objects, artificial objects, scenes, and numerous other things. Images can be captured using cameras and other image capture devices, generated by computers, created by artists and other users, and created in various other ways. Images can be, but are not necessarily, composed of pixels arranged in a rectangular array with a certain height and width. Each pixel can consist of one or more bits of information, representing the brightness of the image and/or the color of the image at that point.

As used herein, the term "loop" is used to refer to video content of a finite duration that is played in a repetitive manner such that the video, upon reaching an end of the finite duration, immediately restarts playing at a start of the finite duration.

As used herein, the term "similarity" is used to refer to a similarity between a first set of shapes and spatial relationships in a first frame and a second set of shapes and spatial relationships in a second frame. In one example, an image of a person's face has a higher semantic similarity to an image of another person and a lower semantic similarity to an image of a building. In another example, an image of two people standing close together has a higher semantic similarity to an image of a crowd of people and a lower semantic similarity to an image of a single person.

Example of an Operating Environment for Focus-Based Video Loop Switching

Referring now to the drawings, FIG. 1 depicts an example of a video playback system 100 for switching to a particular video loop based on a user's focus while displaying video content to a user. The playback system 100 includes a set of communicatively coupled components. These components include a computing device 102 that executes a loop-extraction engine 104, a playback store 106 that stores video content 108 and selection data 110, and a presentation device 112 that displays the video content 108 to a user.

The computing device 102 includes one or more processing devices. These processing devices can be included in the same device as the presentation device 112 or be located remotely from the presentation device 112. The playback store 106 includes one or more memory devices having data structures for accessing the video content 108, the selection data 110, or both stored thereon. The presentation device 112 includes one or more devices for displaying the video content 108. In some embodiments, the presentation device 112 also includes one or more additional devices, such as dedicated processors, input devices, audio or tactile output devices, etc.

The loop-extraction engine 104 performs one or more operations that allow loops to be automatically selected and played via the presentation device 112. The presentation device 112 is used to display at least a portion of the video content 108 to a user. Examples of the presentation device 112 include VR equipment, a television, a display screen of a computing monitor, etc.

The loop-extraction engine 104 selects the loops based on a focus indicator and similarity information in the selection data 110. A focus indicator includes any data, such as orientation data for a VR presentation device 112, that indicates a region of interest at which a user is looking or likely looking. Similarity information includes a similarity error or other metric indicating a semantic similarity between image content in two different frames of the video content 108.

For instance, the loop-extraction engine 104 stores selection data 110 such as, for each pair of frames and for each sampled direction, a similarity error in a suitable data structure, such as a three-dimensional matrix. An example of the selection data 110 is a matrix M, in which an element $M(i,j,k)$ represents a similarity error for a loop along the direction k if the loop-extraction engine 104 chooses frame i as a start frame of the loop and frame j as an end frame of the loop. As described in detail with respect to FIGS. 3-6, the selection data 110 can include similarity information that is computed based on content in regions of interest for two frames, rather than being computed for all content from the two frames.

In some embodiments, the loop-extraction engine 104 computes the selection data 110, such as similarity error values, in real time. An example of computing selection data 110 in real time includes computing and storing the selection data 110 while at least some of the video content 108 is being displayed to a user by the presentation device 112.

In additional or alternative embodiments, loop-extraction engine 104 includes a pre-processing engine 105. The pre-processing engine 105 samples certain regions of interest for a video (e.g., directions with respect to a 360-degree video) and pre-computes a similarity matrix M or other selection data 110 for those regions of interest. For instance, the pre-processing engine 105 could use viewing directions that have been sampled uniformly from the horizon of the 360-degree video content 108. These embodiments involve an assumption that most users will be looking along the horizon for a given 360-degree video content 108. In other embodiments, such an assumption may not be valid or useful. If the pre-processing engine 105 has access to information about expected viewing directions (e.g., the most likely viewing directions), the pre-processing engine 105 could sample more of the viewing directions that are more likely to be used as compared to samples of the viewing directions that are less likely to be used. For example, in an interactive movie experience, the most "interesting" directions (e.g., directions in which more action occurs) may be used as the directions to analyze.

For illustrative purposes, FIG. 1 depicts a single playback system 100 that includes a computing device 102, a playback store 106, and a presentation device 112. In some embodiments, the single playback system 100 can be a server system that includes some or all of these devices. But other implementations are possible. For instance, a server system could include a first computing device 102 (or group of devices) that executes the pre-processing engine 105 and thereby computes at least some similarity information that is stored as the selection data 110. A client computing device could include a second computing device 102 (or group of devices), which executes the loop-extraction engine 104, and the presentation device 112. The client computing device could execute the loop-extraction engine 104 and thereby access the selection data 110 from the playback store 106 via a data network. The loop-extraction engine 104 could use the accessed selection data 110 to automatically select a loop based on detecting a change in a user's region of interest (i.e., switching loops based on one or more focus indicators).

Figure 2:
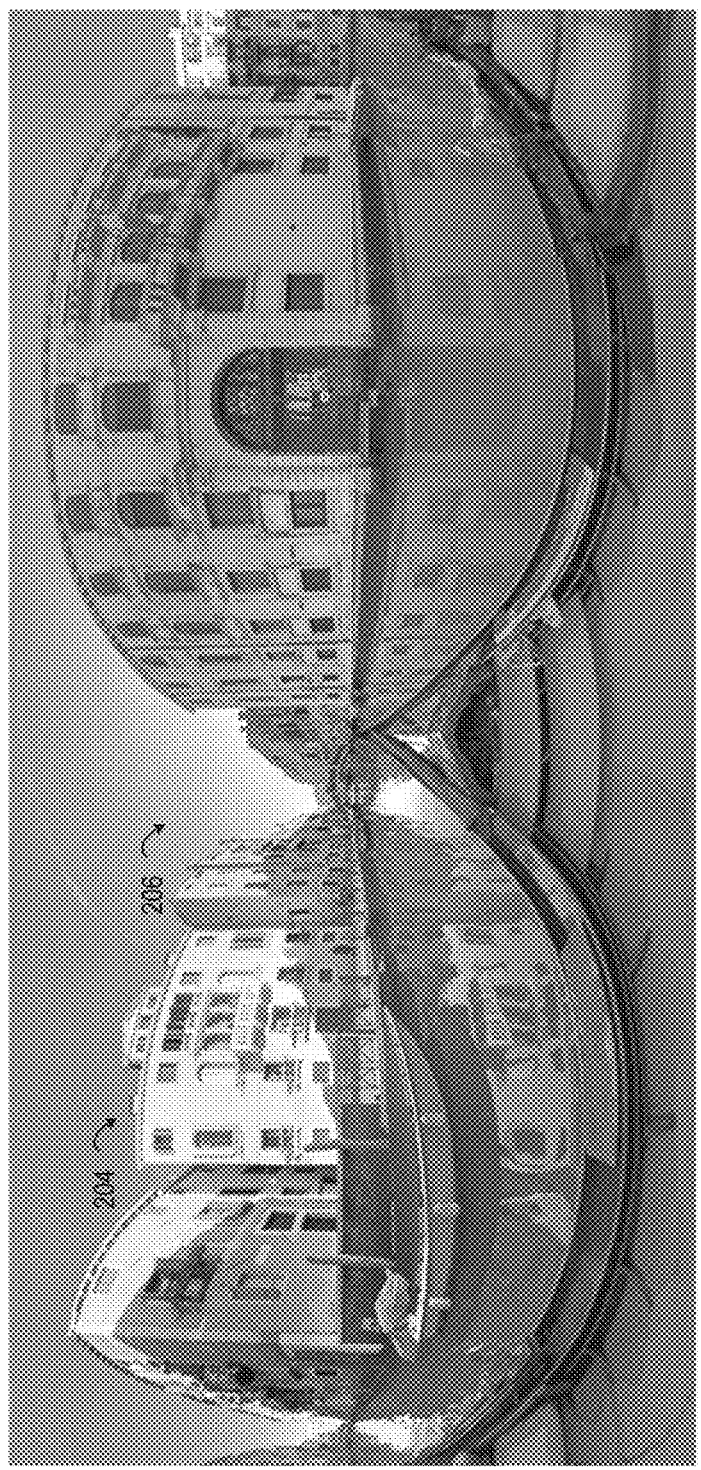
FIG. 2 depicts an example of a frame of a 360-degree video content that can be used for focus-based switching in the system of FIG. 1, according to certain embodiments of the present disclosure.

One example of video content 108 is a 360-degree video. FIG. 2 depicts an example of a frame 202 from a 360-degree video from which loops can be extracted by the loop-extraction engine 104 in response to a change in the user's region of interest. For instance, a first region of interest could be the region 204, which depicts a building. The presentation device 112 (e.g., VR equipment) displays the building to a user based on the user being oriented in a certain direction. The loop-extraction engine 104 could subsequently determine that the user's focus has changed to a second region of interest, such as the region 206, based on the presentation device 112 being re-oriented in a second direction. The loop-extraction engine 104 identifies a loop from the video content 108 in the region 206.

Figure 3:
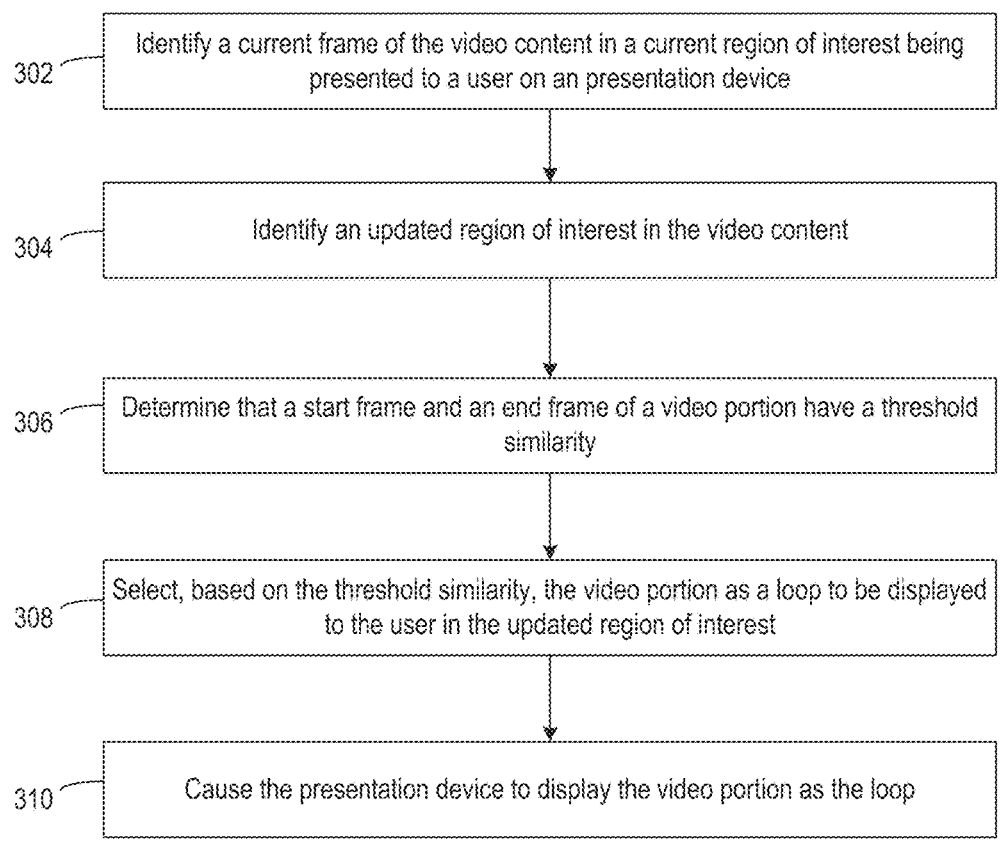
FIG. 3 depicts an example of a process for performing focus-based video loop switching when displaying video content to a user, according to certain embodiments of the present disclosure.

FIG. 3 depicts an example of a process 300, which may be performed by the video playback system 100 or another suitable computing system, for performing focus-based video loop switching when displaying video content to a user. In some embodiments, one or more computing devices 102 implement operations depicted in FIG. 3 by executing suitable program code (e.g., the loop-extraction engine 104). For illustrative purposes, the process 300 is described with reference to certain examples depicted in the figures. Other implementations, however, are possible.

At block 302, the process 300 involves identifying a current frame of the video content in a current region of interest being presented to a user on an output device. At block 304, the process 300 involves identifying an updated region of interest in the video content. One or more processing devices execute the loop-extraction engine 104 or other program code to implement block 304. To implement blocks 302 and 304, one or more computing devices 102 execute the loop-extraction engine 104 (or suitable other program code). The loop-extraction engine 104 performs one or more operations that identify a user's region of interest with respect to particular video content 108.

In some embodiments, the video content 108 includes a 360-degree video and the presentation device 112 is a VR device that tracks an orientation of the VR device with respect to the 360-degree video. The loop-extraction engine 104 identifies a particular region of interest (i.e., the region from blocks 302 or 304) based on an orientation of the VR device. For instance, the loop-extraction engine 104 can determine a change in the region of interest between blocks 302 and 304 by determining that the orientation of the VR device has changed from a first orientation in which the current region of interest is displayed by the VR device to a second orientation in which the updated region of interest is displayed by the VR device.

Any suitable data from a VR environment can be used to identify a user's orientation or otherwise identify a user's focus. A VR environment simulates the physical presence of a user in places in the real world, or in an imaginary world, often in a highly visual three-dimensional manner. VR environments can involve visual experiences, displayed either on a computer screen or through special stereoscopic displays, as well as additional sensory experiences provided through speakers, headphones, and haptic systems using tactile information. A user may interact with the VR environment via standard input devices such as a keyboard and mouse, or more advanced multimodal devices, such as a wired glove (or data glove) may be used or head-mounted display. For instance, a head-mounted display presents video content in a field of view as seen by the user from a particular position and in a particular direction in the VR environment. The head-mounted display uses accelerometers, gyroscopes, eye-tracking devices, and other devices to track the user's position and orientation for this purpose. Input data received through one or more of these devices can be provided to the loop-extraction engine 104 from the presentation device 112 and thereby allow the loop-extraction engine 104 to identify a user's orientation.

In additional or alternative embodiments, the loop-extraction engine 104 identifies a region of interest in 360-degree video or other type of video content 108 based on analysis of the semantic content of a video. In one example, the loop-extraction engine 104 could identify regions of the video content in which certain types of objects, such as human beings, are depicted. A region depicting these types of content is more likely to be a region of interest than a region with content such as buildings or other non-moving content. In another example, the loop-extraction engine 104 could distinguish between foreground and background objects in a frame. Foreground objects are more likely to be located in regions of interest than background objects. In another example, the loop-extraction engine 104 identifies a region of interest from a deep network that is trained to predict saliency (or interestingness), where the deep network is used to analyze one or more regions of the video content 108 and thereby identify likely regions of interest. In another example, the loop-extraction engine 104 receives data from an eye-gaze device, which can be included in the presentation device or be a separate device, that identifies a region of interest. The eye-gaze device can receive user input (e.g., annotations) indicating which portions of the video content 108 may be interesting. In another example, a region of interest could be associated with visual effects, such as depth-of-field and washing out of colors, that are used to encourage a viewer to look in a direction. The loop-extraction engine 104 identifies potential regions of interest based on which portions of the video content 108 include these effects.

At block 306, the process 300 involves determining that a start frame and an end frame of a video portion have a threshold similarity. One or more processing devices execute the loop-extraction engine 104 or other program code to implement block 306.

In some embodiments, the loop-extraction engine 104 determines that a threshold similarity exists based on a ranking of various loops with respect to their similarity errors or other similarity metrics. For instance, the loop-extraction engine 104 identifies candidate loops in the updated region of interest. The loop-extraction engine 104 ranks the candidate loops in accordance with similarities between respective start frames of the candidate loops and respective end frames of the candidate loops. In this example, the ranking applies a first rank to the video portion of block 306 and a second rank to another one of the candidate loops. The loop-extraction engine 104 determines that the first rank is greater than the second rank. The loop-extraction engine 104 uses this difference in ranks to select the video portion.

In some embodiments, the loop-extraction engine 104 uses feature vectors to determine that the start frame and the end frame of a video portion have the threshold similarity. For instance, the loop-extraction engine 104 computes a start-frame feature vector for the start frame and an end-frame feature vector for the end frame. The loop-extraction engine 104 uses the vectors to determine a degree of similarity between the start and end frames. One example of using the vectors to determine this degree of similarity is computing a Euclidean distance between the start-frame feature vector and the end-frame feature vector and determining that the distance is within a threshold distance. Another example of using the vectors to determine this degree of similarity is computing a cosine similarity between the start-frame feature vector and the end-frame feature vector and determining that the cosine similarity is within a certain threshold. Other examples of relevant distance measures include an L1 norm, an L0 norm, and L_infinity norm, or a KL divergence.

The similarity of different video frames can be determined in any suitable manner. In some embodiments, the loop-extraction engine 104 selects a portion of the video content 108 by intelligently selecting similar start and end frames for the video portion that will be repeated. In one example, the loop-extraction engine 104 generates, selects, or otherwise accesses a lower-resolution version of the fixed-length video clip, and detects a presence of edges within image frames in the lower-resolution version. A pair of image frames having similar content near the edges are identified as a pair of candidates for a transition point (i.e., one or more of a start frame and an end frame) at which an output loop can repeat. The low-resolution versions of the clips can be full-frame or can be less-than-full-frame. Applying edge mask filtering to the low-resolution frames allows frames that have similar edge features to be identified as transition points (e.g., as starting an end frames). An edge mask specifies the types of edges identified in the image, such as edges having a specific orientation, edges having a certain level of contrast, edges having a certain minimum level of discontinuity, or the like. An edge mask filter applied to a particular image in a frame of video content 108 extracts the specified type of edges from the particular image.

In some embodiments, the loop-extraction engine 104 determines the similarity of a set of frames by comparing video content within a union of edge masks of the frames. The union of edge masks is used to identify portions of the video to be used for comparison when selecting a new loop. For instance, the loop-extraction engine 104 compares the regions of interest of the union of edge masks of the frames. A region of interest is a portion of a video having the user's focus (i.e., where the user is currently looking or likely looking). The comparison can be limited to regions of interest in the union of edge masks. Doing so allows the loop-extraction engine 104 to identify frames that are similar with respect to the user's focus. In this manner, the loop-extraction engine 104 can detect one or more loops specific to the user's region of interest (e.g., the user's orientation with respect to a 360-video or other focus indicator).

Figure 4:
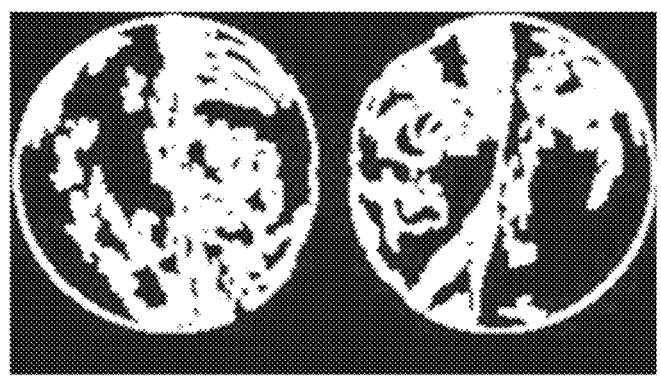
FIG. 4 depicts an example of an edge union mask from 360-degree video content used by the process of FIG. 3, according to certain embodiments of the present disclosure.
Figure 5:
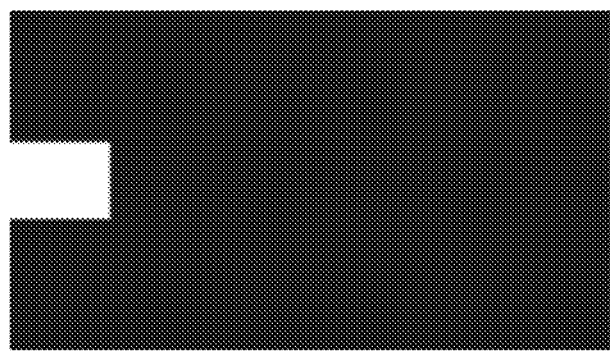
FIG. 5 depicts an example of an interest region mask used by the process of FIG. 3, according to certain embodiments of the present disclosure.

For example, an edge mask union 400 that is the union of the edge masks of two frames is depicted in FIG. 4, which depicts a frame of 360-degree video content 108. The loop-extraction engine 104 uses the intersection of the original edge masks of two frames and the region of the interest to determine a similarity of the frames. In some embodiments, the loop-extraction engine 104 also receives data indicating that the user is looking along a direction with the corresponding region of interest.

In some embodiments, the loop-extraction engine 104 creates a mask based on a possible user orientation or other focus indicator. The mask includes a white region corresponding to the area on which a user is focused. For instance, the white region could correspond to an area the user can see while looking in a particular direction. The white region is selected as the region of interest.

In one example, the loop-extraction engine 104 receives data indicating that a user is looking at a particular point. The point can be defined in a spherical coordinate system in which θ is the polar angle and φ is the azimuthal angle. If the point is located at θ=30 degrees and φ=90, the loop-extraction engine 104 can generate an interest-region mask 500 depicted in FIG. 5.

Figure 6:
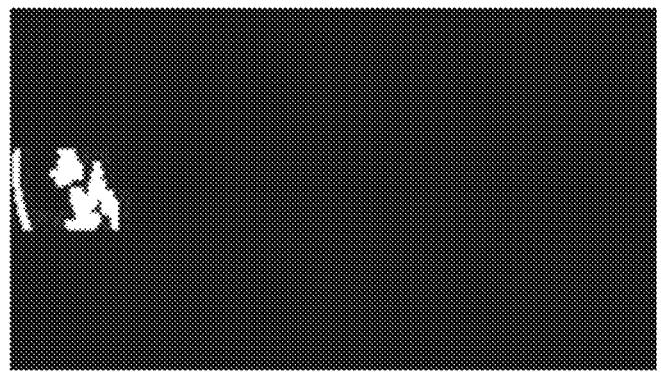
FIG. 6 depicts an example of an intersection of the edge union mask of FIG. 4 and the interest region mask of FIG. 5, according to certain embodiments of the present disclosure.

The loop-extraction engine 104 executes a similarity-determination operation. A similarity-determination operation could include, for example, computing feature vectors of two sets of frame content, respectively, and calculating the proximity, cosine similarity, or other similarity metrics with respect to the feature vectors in the relevant vector space, as described above. In this example, the similarity-determination operation is limited to the intersection of the interest-region mask 500 depicted in FIG. 5 and the edge mask union 400 depicted in FIG. 4. Such an intersection 600 is depicted in FIG. 6. By limiting the similarity-determination operation to edges in the intersection 600, the loop-extraction engine 104 compares regions in the intersection 600 to account for user orientation (or other user focus indicators) when computing the similarity of the frames, rather than computing the similarity using the full edge mask union 400.

Returning to FIG. 3, at block 308, the process 300 involves selecting, based on the threshold similarity, the video portion as a loop to be displayed to the user in the updated region of interest. One or more processing devices execute the loop-extraction engine 104 or other program code to implement block 308.

As one example of blocks 306 and 308, the loop-extraction engine 104 receives a 360-degree video as an input. The loop-extraction engine 104 analyzes a spherical panorama of the 360-degree video with respect to a set of sampled viewing directions. For each sampled viewing direction, the loop-extraction engine 104 computes a list of candidate loops. The loop-extraction engine 104 ranks the loops in accordance with the similarity between start and end frames of the loops. The loop-extraction engine 104 stores, for each pair of frames and for each sampled direction, a similarity error in a suitable data structure, such as a three-dimensional matrix. For instance, for a matrix M, an element M(i,j,k) represents a similarity error for a loop along the direction k if the loop-extraction engine 104 chooses frame i as a start frame of the loop and frame j as an end frame of the loop.

Continuing with this example, the video playback system 100 plays a 360-degree video on a suitable display device, such as a VR presentation device 112. The computing device 102 receives data from the VR presentation device 112, where the data indicates an orientation of the user. The loop-extraction engine 104 determines, based on the received data, the orientation of the user. The loop-extraction engine 104 identifies, based on the orientation, a sampled viewing direction k. The sampled viewing direction k could be the viewing direction closest to the direction in which the user is oriented. The loop-extraction engine 104 selects, from the matrix M, a suitable loop along this direction k. A suitable loop could be a loop with a similarity error indicating a greatest similarity between start frame i and end frame j along direction k. In some embodiments, the loop-extraction engine 104 selects a loop having an end frame that is after a current frame being displayed to a user. Doing so ensures the loop-extraction engine 104 will advance the video time.

In some embodiments, the loop-extraction engine 104 implements crossfading. The crossfading involves linearly blending a current frame and a new frame for a short duration. Doing so can avoid abrupt shifts between frames when a particular loop restarts or when the loop-extraction engine 104 shifts between two loops.

The loop-extraction engine 104 can use any suitable process for selecting a different loop in response to detecting a change in a user's focus. The following examples illustrate different processes for selecting loops based on a change in a user's direction with respect to a 360-degree video content 108. But any focus indicator can be used to trigger these processes.

In one example, the loop-extraction engine 104 selects a loop based on a sufficient similarity between start and end frame in a loop for a particular direction. The loop-extraction engine 104 could determine that a user's orientation has changed from a current direction $d_1$ to a new direction $d_2$. The loop-extraction engine 104 selects the loop having a minimum similarity error $E=M(f_s, f_e, d_2)$, where $f_s$ is the start frame and $f_e$ is the end frame.

In another example, the loop-extraction engine 104 selects a loop based on both a time index for the current frame and a sufficient similarity between start and end frame in a loop for a particular direction. This ensures that the selected loop in the new direction $d_2$ has an end frame that is after the frame currently being displayed to the user (i.e., an end frame having a later time index than the current frame). For instance, frame $f_c$ could be displayed to a user while the user is oriented in a current direction $d_1$. in the original direction. The loop-extraction engine 104 identifies one or more candidate loops in which $f_e > f_c$ (i.e., the time index for $f_c$ is earlier than the time index for $f_e$). The loop loop-extraction engine 104 selects one of these candidate loops having a minimum similarity error $E=M(f_s, f_e, d_2)$ subject to $f_e > f_c$.

In another example, the loop-extraction engine 104 selects a loop based on both a time index for the current frame, a sufficient similarity to the current frame, and a sufficient similarity between start and end frame in a loop for a particular direction. In some embodiments, this involves selecting a loop in the new direction $d_2$ such that the start frame of the loop is sufficiently similar to the current frame and the end frame of the loop is after the current frame in the original direction. For instance, the loop-extraction engine 104 could determine that a user's orientation has changed from a current direction $d_1$ to a new direction $d_2$. In the current direction $d_1$, the video playback system 100 is currently displaying the frame $f_c$ to the user. The loop-extraction engine 104 selects a loop having a minimum similarity error $E=M(f_s, f_e, d_2)+\lambda M (f_c, f_s, d_2)$, subject to $f_e > f_c$. In this example, the weight A is a constant indicating a degree to which the loop-extraction engine 104 considers the similarity between a current frame and a start frame from the loop in direction $d_2$. An optimal loop in the new direction $d_2$ will be the loop with a minimum value of E having a start frame $f_s$ and an end frame $f_e$, where the time index of the end frame $f_e$ is later than the current frame $f_c$. Varying the value of λ can cause the loop-extraction engine 104 to select different loops as the optimal loops. For instance, higher values of λ can indicate a higher priority for the start frame of the selected loop in the direction $d_2$ being similar to the current frame $f_c$ in direction $d_1$ and a lower priority for finding a loop in the direction $d_2$ having similar start and end frames.

At block 310, the process 300 involves causing the output device to display the video portion as the loop. One or more processing devices execute the loop-extraction engine 104 or other program code to implement block 310. Executing the loop-extraction engine 104 causes one or more computing devices 102 to access, from a playback store 106 that is stored in a non-transitory computer-readable medium, at least some of the video content 108. The accessed portion of the video content 108 is used as a loop. Executing the loop-extraction engine 104 also causes one or more computing devices 102 to provide the accessed video data to the presentation device 112 as the loop.

In some embodiments, accessing and providing the video content 108 involves communicating, via a data bus, suitable signals between a local non-transitory computer-readable medium, a local computing device 102, and a local presentation device 112. In additional or alternative embodiments, accessing the video content 108 involves communicating, via a data network, suitable signals between a computing system that includes the non-transitory computer-readable medium, a computing system that includes the computing device 102, and a computing system that includes the presentation device 112.

In some embodiments, the process 300 can be performed on a server system that computes similarity information in the selection data 110 and selects one or more loops based on the selection data 110. In additional or alternative embodiments, the various operations described herein can be divided between a server system and a client device. The server system can compute similarity information and store the similarity information as the selection data 110. The client device can communicate with the server system to access the server-computed selection data 110. The client device can select one or more loops based on the selection data 110.

Example of Selecting a Loop Based on Similarity of Start and End Frames

The loop-extraction engine 104 can perform any suitable process for selecting a loop. The following example is provided as an illustration of using edge masks to select a loop. But other implementations may be used.

In this example, the loop-extraction engine 104 implements a lower-resolution version of a fixed-length high-resolution video clip. The loop-extraction engine 104 detects a presence of edges within image frames in the lower-resolution version to form edge maps. An edge map is a matrix of pixel data resulting from applying an edge mask to an image (i.e., performing edge detecting). An edge map indicates locations of edges (i.e., boundaries) of objects in the image. The edge mask specifies the types of edges identified in the image, such as edges having a specific orientation, edges having a certain level of contrast, edges having a certain minimum level of discontinuity, or the like.

In some embodiments, the loop-extraction engine 104 uses the edge maps to generate a confusion matrix. A confusion matrix is a matrix of data indicating a quantity of difference, at a pixel level, between two images. A confusion matrix can be used to identify a most similar image pair from a group of images by (1) preparing the confusion matrix from video frames and edge maps derived from those video frames, and then (2) identifying a minimum value in the confusion matrix to identify a minimum level of differences between two images. The confusion matrix indicating the minimum level of differences corresponds to the two images, in the group of images, which are most similar.

The loop-extraction engine 104 prepares a confusion matrix by adding pixel differences between full-color frames, for any area that is a part of either of the edge maps formed from the frames. For instance, a similarity of the frames is compared only where there exists an edge in one frame or the other. In other words, the confusion matrix identifies a total difference between un-masked pixels in corresponding frames. The confusion matrix is then filtered. At least one pair of image frames having similar edges are determined, by identifying a minimum value in the filtered confusion matrix, as a pair of candidates for a transition point (i.e., a start frame and an end frame) at which an output loop can repeat. A candidate loop is rendered from the high-resolution video clip, with the candidate loop having a start frame and an end frame corresponding to the transition point.

For instance, multiple high-resolution video clips are compared to identify at least one transition point between the high-resolution video clips. Thus, the loop-extraction engine 104 can determine at least one candidate transition point between at least two videos. In another example, one high-resolution video clip is compared to itself to identify at least one transition point within the one high-resolution video clip.

Continuing with this example, the loop-extraction engine 104 converts a high-resolution video clip having multiple higher-resolution frames into a lower-resolution video clip having multiple lower-resolution frames. The lower-resolution clip can be created by making each new pixel in the lower-resolution video clip have a pixel value (e.g., a color) that is an average of pixel values from an area, in the higher-resolution video clip, that the new pixel represents. For example, downsizing the higher-resolution video clip by a factor of four produces new pixels in the lower-resolution video clip, where each new pixel has a value that is an average of sixteen pixels from the higher-resolution video clip. The lower-resolution video clip can be full-frame or less-than full-frame. The conversion reduces a dataset upon which further processing is implemented. The conversion can thus produce a loop in a faster manner, using fewer processor cycles and less energy than conventional techniques.

Continuing with this example, the loop-extraction engine 104 creates edge maps of the lower-resolution frames by performing edge-detection on the lower-resolution frames in the lower-resolution video clip. The edges show which parts of the lower-resolution frames are important and should subsequently be compared with each other. In other words, the edges can act as a proxy for saliency maps. Performing edge-detection also helps to identify salient image features, such as edges of an object which should not be teleported, while discarding unnecessary image features. The edge-detection thus quickly approximates saliency in order to enable quickly determining whether two compared images can form a candidate transition point. In some embodiments, a Canny edge detector can be implemented while performing the edge-detection. Performing edge-detection advantageously reduces the dataset to be processed, which speeds implementing the loop-extraction engine 104.

Continuing with this example, the loop-extraction engine 104 forms, using the lower-resolution video clip and the edge maps, a confusion matrix that identifies pixels that are parts of edges. A confusion matrix can help identify strength of a candidate transition point. The confusion matrix can be prepared by adding pixel differences between full-color frames, for any area that is a part of either of the edge maps formed from the frames. For example, similarity of the frames is compared only where there exists an edge in one frame or the other.

Continuing with this example, the loop-extraction engine 104 generates a filtered confusion matrix by convolving the confusion matrix with a diagonal filter. Using a filtered confusion matrix avoids simply comparing appearances of single frames, and instead compares local, short video clips. For example, convolving with a 5×5 diagonal kernel requires that five consecutive frames be similar. As a further example, if the video clip includes video of a swinging pendulum, and only single frames are compared, then the resultant loop may show the pendulum instantly switching directions mid-swing, instead of going about a full swing. This could happen because the pendulum could be in the same instantaneous configuration on its downward and upward paths. Comparing multiple frames can avoid this.

Continuing with this example, the loop-extraction engine 104 determines a candidate transition point by identifying a minimum value in the filtered confusion matrix. This determining technique can provide a loop which is more accurate, which appears natural, and which is composed in a manner which has minimal (or no) teleporting when compared to conventional techniques. In some embodiments, the determination of the candidate transition point is constrained to compare fewer than all of the frames in the lower-resolution video clip. Comparing fewer than all frames can occur, for example, when the resultant loop is to have a maximum duration (e.g., be no more than ten seconds long), is to be produced from a certain portion of the higher-resolution video, or both. Comparing fewer than all of the frames can advantageously save processor cycles and time. In other embodiments, determination of the candidate transition point is such that a candidate loop is constrained to at least one of a minimum duration or a maximum duration. A video having too short of a duration may appear to merely show a vibrating object, while a clip that is too long may not retain user attention for the entire length of the loop. Further, videos which are too long may require using too much data storage. A user input can be received which sets the minimum duration or a maximum duration.

Continuing with this example, the loop-extraction engine 104 renders one or more candidate loops from the high-resolution video clip. A candidate loop has a start frame and an end frame corresponding to the candidate transition point. In some embodiments, multiple looping videos can be rendered and displayed to provide a group of candidate looping videos. The group may include a number (e.g., three, ten, a number between 1 to 50, etc.) of candidate looping videos having the best transition points. The group of candidate looping videos can be displayed on a display to enable a user to choose one or more preferred videos from the group of candidate looping videos.

In some embodiments, the loop-extraction engine 104 performs an optical-flow alignment on the candidate looping video to align the start frame with the end frame. An optical-flow alignment locally manipulates at least one start frame with at least one end frame so that the start frame and the end frame align with each other as closely as possible. For example, a transition having one-half a second of frames (e.g., 15 frames, thirty frames, etc.) is rendered. During the transition, leaves of a flower are not 100% aligned with each other between the start frame and the end frame. Performing an optical-flow alignment on the video moves the leaves to overlap exactly with each other so that the transition appears smooth and natural-appearing.

Examples of Devices in a Playback System

Figure 7:
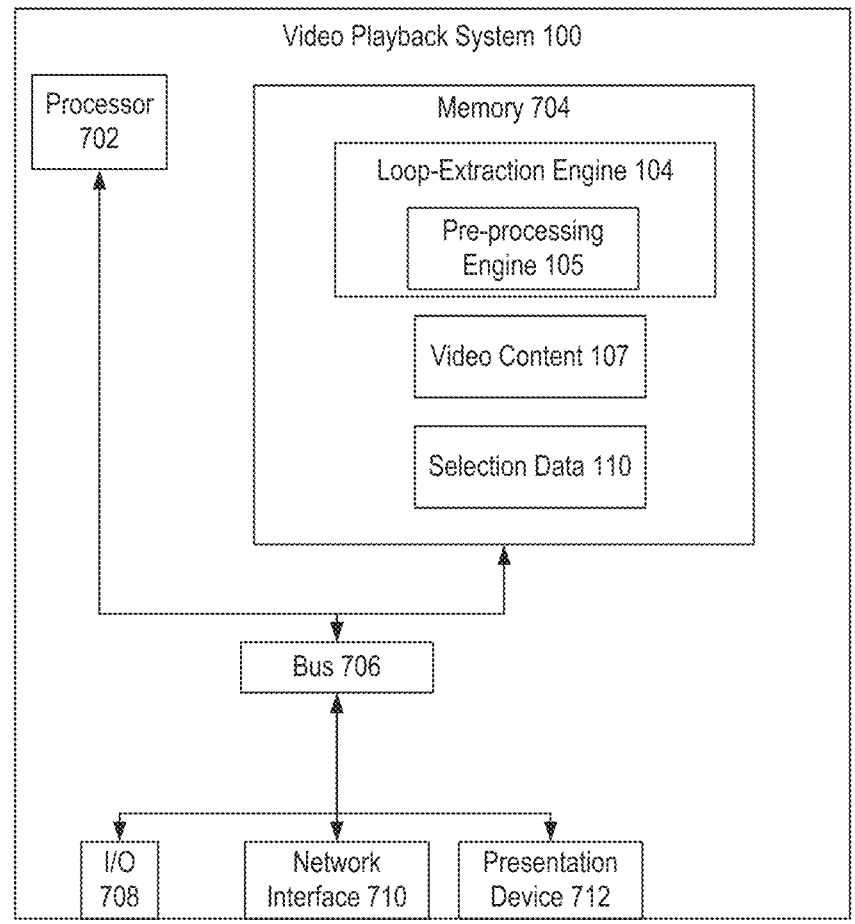
FIG. 7 depicts an example of an implementation of the playback system of FIG. 1, according to certain embodiments of the present disclosure.

Any suitable computing system or group of computing systems can be used for performing the operations described herein. For example, FIG. 7 depicts an example of a playback system 100. In some embodiments, the playback system 100 includes a processing device that executes the loop-extraction engine 104, a memory that stores the playback store 106, and a presentation device 112 that plays video content, as depicted in FIG. 7. In other embodiments, separate computing systems having devices similar to those depicted in FIG. 7 (e.g., a processor, a memory, etc.) executes the loop-extraction engine 104.

The depicted examples of a playback system 100 includes a processor 702 (e.g., the computing device 102 of FIG. 1) communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The playback system 100 may also include a number of external or internal devices, such as input or output devices. For example, the playback system 100 is shown with one or more input/output ("I/O") interfaces 708. An I/O interface 708 can receive input from input devices or provide output to output devices. One or more buses 706 are also included in the playback system 100. The bus 706 communicatively couples one or more components of a respective one of the playback system 100.

The playback system 100 executes program code that configures the processor 702 to perform one or more of the operations described herein. The program code includes, for example, the loop-extraction engine 104, the pre-processing engine 105, a video playback application, or other suitable applications that perform one or more operations described herein. The program code may be resident in the memory device 704 or any suitable computer-readable medium and may be executed by the processor 702 or any other suitable processor. In some embodiments, both the loop-extraction engine 104 and the pre-processing engine 105 are stored in the memory device 704, as depicted in FIG. 7. In additional or alternative embodiments, one or more of the loop-extraction engine 104 and the pre-processing engine 105 are stored in different memory devices of different computing systems. In additional or alternative embodiments, the program code described above is stored in one or more other memory devices accessible via a data network.

The playback system 100 can access the video content 108 and the selection data 110 in any suitable manner. In some embodiments, one or more of these data sets and engines are stored in the same memory device (e.g., one or more memory devices 704), as in the example depicted in FIG. 7. In additional or alternative embodiments, one or more of the data sets and engines described herein are stored in one or more other memory devices accessible via a data network. For example, a playback system 100 that executes the pre-processing engine 105 to generate the selection data 110 can provide access to the selection data 110 by external systems that execute the loop-extraction engine 104. Furthermore, video content 108 that is associated with the selection data 110 can be stored in the same memory device as the selection data 110, as depicted in FIG. 7, or stored in a remote memory device from an independent video content system.

In some embodiments, the playback system 100 also includes a network interface device 710. The network interface device 710 includes any device or group of devices suitable for establishing a wired or wireless data connection to one or more data networks. Non-limiting examples of the network interface device 710 include an Ethernet network adapter, a modem, and/or the like. The playback system 100 is able to communicate with one or more other computing devices (e.g., a computing device executing an loop-extraction engine 104) via a data network using the network interface device 710.

In some embodiments, the playback system 100 also includes the presentation device 112 depicted in FIG. 7. A presentation device 112 can include any device or group of devices suitable for providing visual, auditory, or other suitable sensory output. Non-limiting examples of the presentation device 112 include a touchscreen, a monitor, a speaker, a separate mobile computing device, etc. In some aspects, the presentation device 112 can include a remote client-computing device that communicates with the playback system 100 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method performed by one or more processing device for performing focus-based video loop switching when displaying video content to a user, the method comprising:
determining that a start frame and an end frame of a video portion have a threshold similarity, wherein the video portion is a portion of the video content and is within a current region of interest presented to a user on a presentation device, wherein determining that the start frame and the end frame of a video portion have the threshold similarity comprises:
computing a distance between a start-frame feature vector generated for the start frame and an end-frame feature vector generated for the end frame, and
determining that the distance is within a threshold distance;
selecting, based on the threshold similarity, the video portion as a loop to be displayed to the user in an updated region of interest in the video content; and
causing the presentation device to display the video portion as the loop.

2. The method of claim 1, wherein determining that the start frame and the end frame of a video portion have the threshold similarity comprises:
identifying candidate loops in the updated region of interest, wherein the candidate loops include the video portion;
ranking the candidate loops in accordance with similarities between respective start frames of the candidate loops and respective end frames of the candidate loops, wherein the ranking applies a first rank to the video portion and a second rank to one of the candidate loops; and
determining that the first rank is greater than the second rank.

3. The method of claim 1, wherein a current frame of the video content in the current region of interest has a first time index and wherein the method further comprises determining that the end frame of the video portion has a second time index that is subsequent to the first time index, wherein the video portion is also selected based on the second time index being subsequent to the first time index.

4. The method of claim 1, wherein a current frame of the video content in the current region of interest has a first time index and wherein the method further comprises determining that the current frame and the start frame of the video portion have an additional threshold similarity, wherein the video portion is also selected based on the additional threshold similarity.

5. The method of claim 4, wherein the method further comprises determining that the end frame of the video portion has a second time index that is subsequent to the first time index, wherein the video portion is also selected based on the second time index being subsequent to the first time index.

6. The method of claim 1, wherein:
the video content is included in a 360-degree video,
the presentation device is a virtual reality device that tracks an orientation of the virtual reality device with respect to the 360-degree video, and
identifying the updated region of interest comprises determining that the orientation of the virtual reality device has changed from a first orientation in which the current region of interest is displayed by the virtual reality device to a second orientation in which the updated region of interest is displayed by the virtual reality device.

7. The method of claim 1, further comprising a pre-processing operation that occurs prior to displaying the video content, wherein the pre-processing operation comprises:
sampling a set of regions from the video content, wherein the set of regions has a set of candidate loops;
computing a set of similarities for the set of candidate loops; and
storing a set of similarities in a data structure that associates each region with a similarity for a candidate loop in the region.

8. The method of claim 1, wherein the current region of interest is identified by first data received from the presentation device and indicating a direction of focus by the user and wherein the updated region of interest is identified by second data received from the presentation device and indicating a modified direction of focus by the user.

9. A system comprising:
a processing device;
a presentation device communicatively coupled to the processing device and configured for displaying video content to a user; and
a non-transitory computer-readable medium communicatively coupled to the processing device, wherein the processing device is configured to execute program code stored in the non-transitory computer-readable medium and thereby perform operations comprising:
determining that a start frame and an end frame of a video portion have a threshold similarity, wherein the video portion is a portion of the video content and is within a current region of interest presented to a user on the presentation device, wherein determining that the start frame and the end frame of a video portion have the threshold similarity comprises:
(i) computing a distance between a start-frame feature vector generated for the start frame and an end-frame feature vector generated for the end frame, and
(ii) determining that the distance is within a threshold distance,
selecting, based on the threshold similarity, the video portion as a loop to be displayed to the user in an updated region of interest in the video content, and
causing the presentation device to display the video portion as the loop.

10. The system of claim 9, wherein determining that the start frame and the end frame of a video portion have the threshold similarity comprises:

identifying candidate loops in the updated region of interest, wherein the candidate loops include the video portion;

ranking the candidate loops in accordance with similarities between respective start frames of the candidate loops and respective end frames of the candidate loops, wherein the ranking applies a first rank to the video portion and a second rank to one of the candidate loops; and determining that the first rank is greater than the second rank.

11. The system of claim 9, wherein a current frame of the video content in the current region of interest has a first time index and wherein the operations further comprise determining that the end frame of the video portion has a second time index that is subsequent to the first time index, wherein the video portion is also selected based on the second time index being subsequent to the first time index.

12. The system of claim 9, wherein a current frame of the video content in the current region of interest has a first time index and wherein the operations further comprise determining that the current frame and the start frame of the video portion have an additional threshold similarity, wherein the video portion is also selected based on the additional threshold similarity.

13. The system of claim 12, wherein the end frame of the video portion has a second time index that is subsequent to the first time index, wherein the video portion is also selected based on the second time index being subsequent to the first time index.

14. The system of claim 9, wherein:

the video content is included in a 360-degree video, the presentation device is a virtual reality device that tracks an orientation of the virtual reality device with respect to the 360-degree video, and identifying the updated region of interest comprises determining that the orientation of the virtual reality device has changed from a first orientation in which the current region of interest is displayed by the virtual reality device to a second orientation in which the updated region of interest is displayed by the virtual reality device.

15. A non-transitory computer-readable medium having program code that is stored thereon, the program code executable by one or more processing devices for performing operations comprising:

determining that a start frame and an end frame of a video portion have a threshold similarity, wherein the video portion is a portion of a video content and is within a current region of interest of the video content presented to a user on a presentation device, wherein determining that the start frame and the end frame of a video portion have the threshold similarity comprises:

computing a distance between a start-frame feature vector generated for the start frame and an end-frame feature vector generated for the end frame, and determining that the distance is within a threshold distance;

selecting, based on the threshold similarity, the video portion as a loop to be displayed to the user in an updated region of interest in the video content; and causing the presentation device to display the video portion as the loop.

16. The non-transitory computer-readable medium of claim 15, wherein a current frame of the video content in the current region of interest has a first time index and wherein the operations further comprise determining that the end frame of the video portion has a second time index that is subsequent to the first time index, wherein the video portion is also selected based on the second time index being subsequent to the first time index.

17. The non-transitory computer-readable medium of claim 15, wherein a current frame of the video content in the current region of interest has a first time index and wherein the operations further comprise determining that the current frame and the start frame of the video portion have an additional threshold similarity, wherein the video portion is also selected based on the additional threshold similarity.

18. The non-transitory computer-readable medium of claim 15, wherein a current frame of the video content in the current region of interest has a first time index and wherein the operations further comprise determining that the end frame of the video portion has a second time index that is subsequent to the first time index, wherein the video portion is also selected based on the second time index being subsequent to the first time index.

* * * * *